W. E. WILSON.
CLAY PRODUCT FACING MACHINE.
APPLICATION FILED MAY 1, 1920.
1,417,788.
Patented May 30, 1922.
5 SHEETS—SHEET 4.
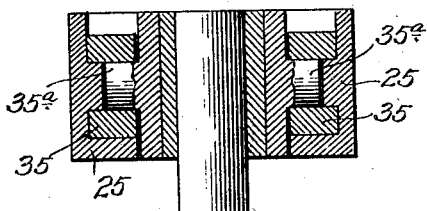
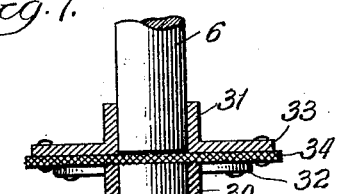
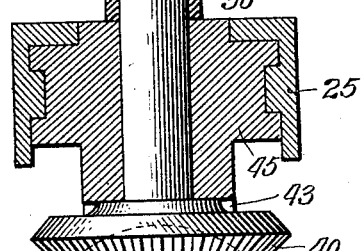
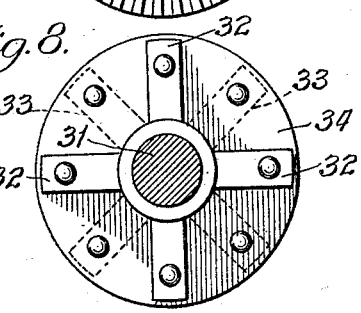
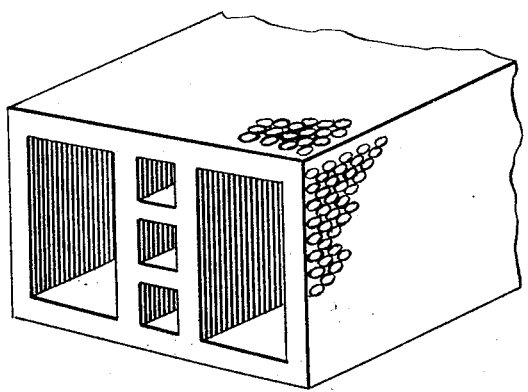
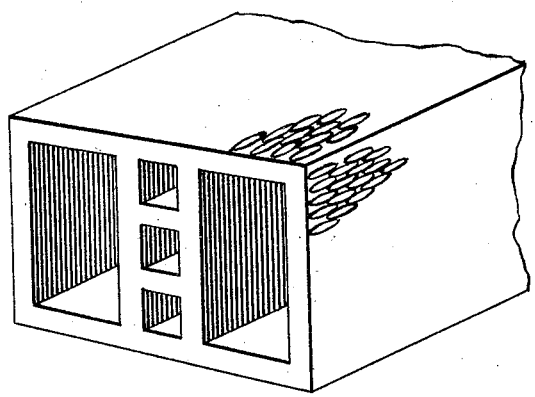
Witness:
John Enders
Merrill M. Blackburn
Inventor:
William E. Wilson,
by Wallace R. Lane.
Atty.

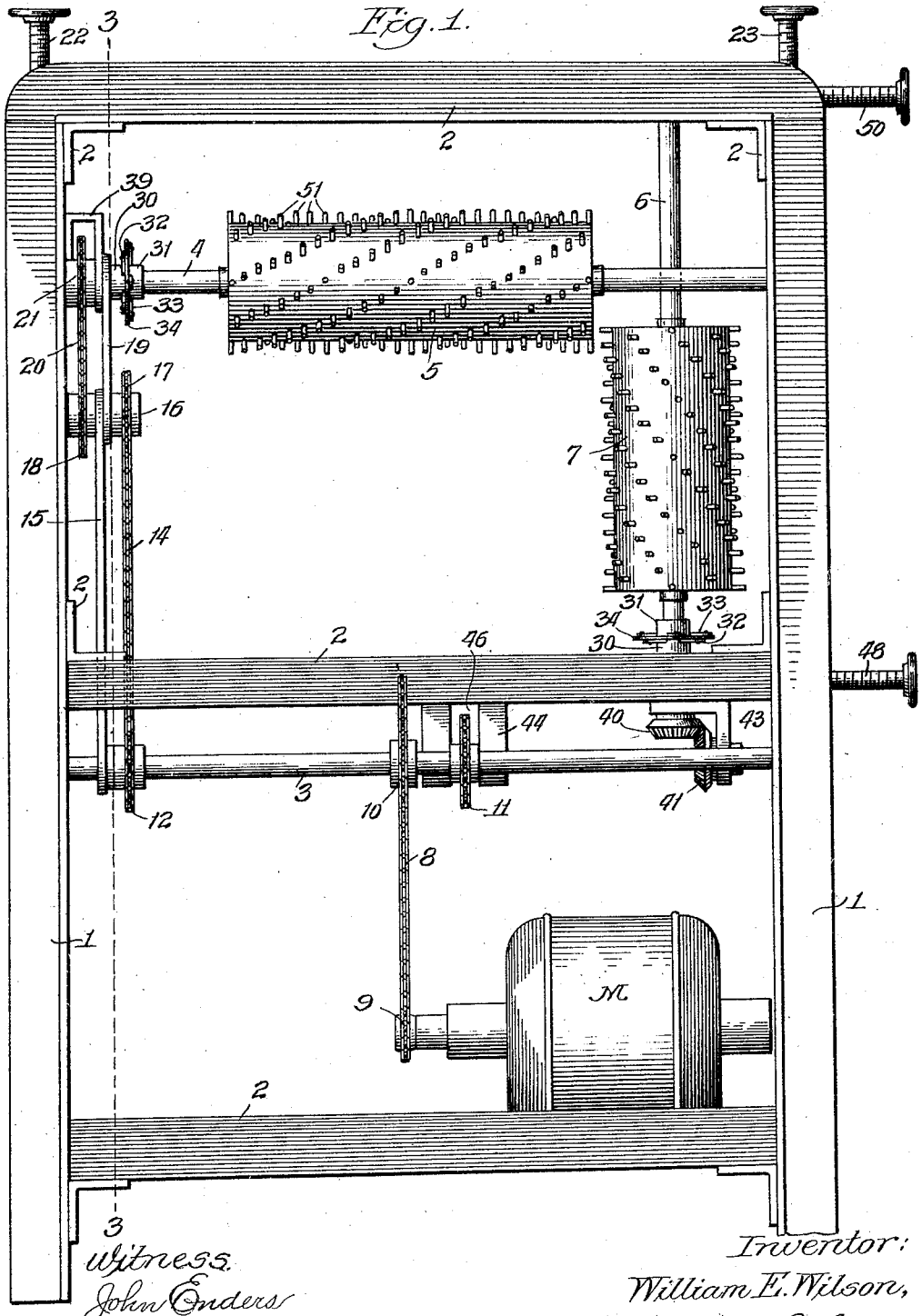

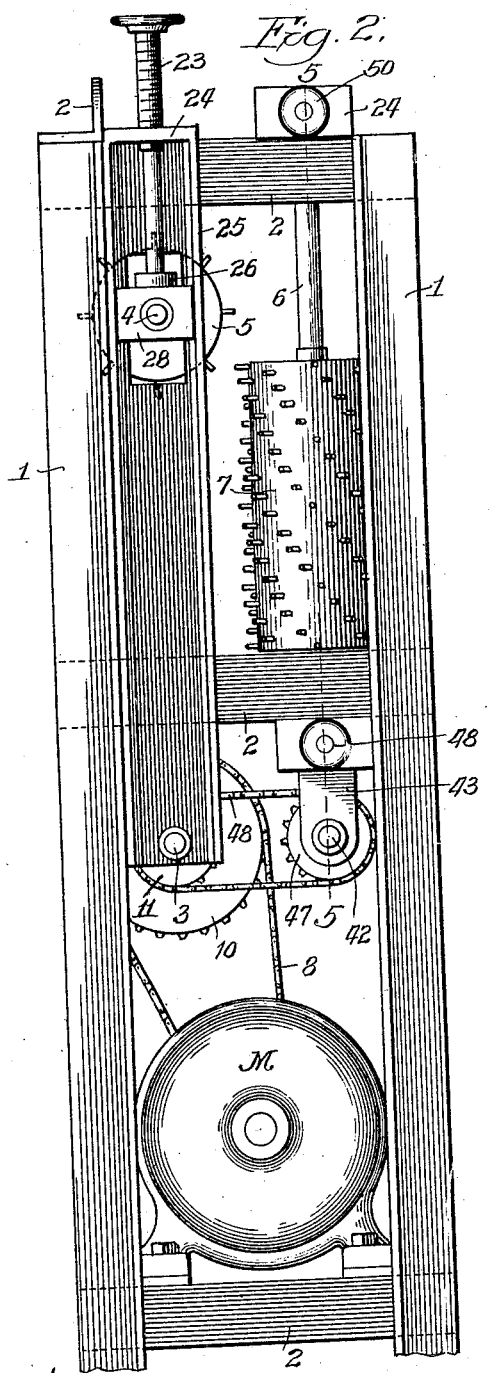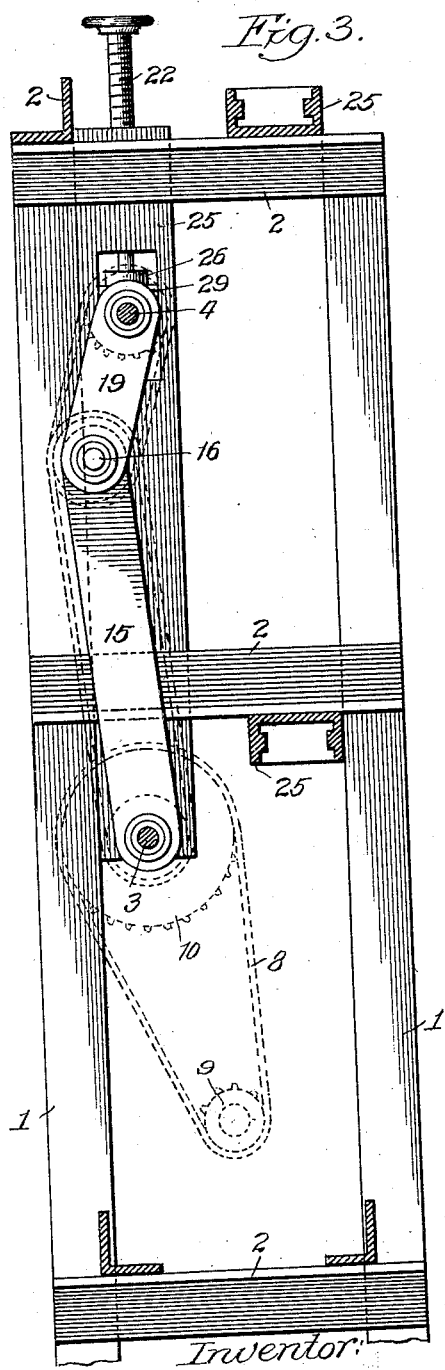

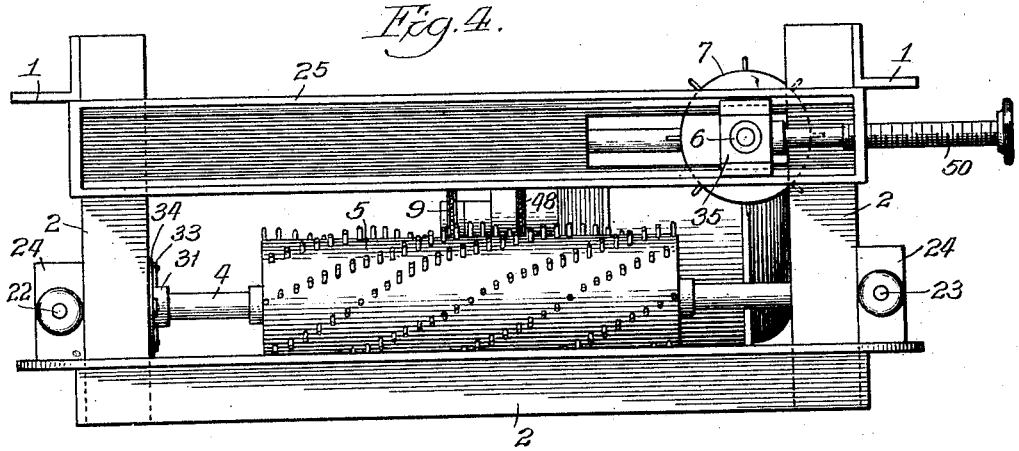
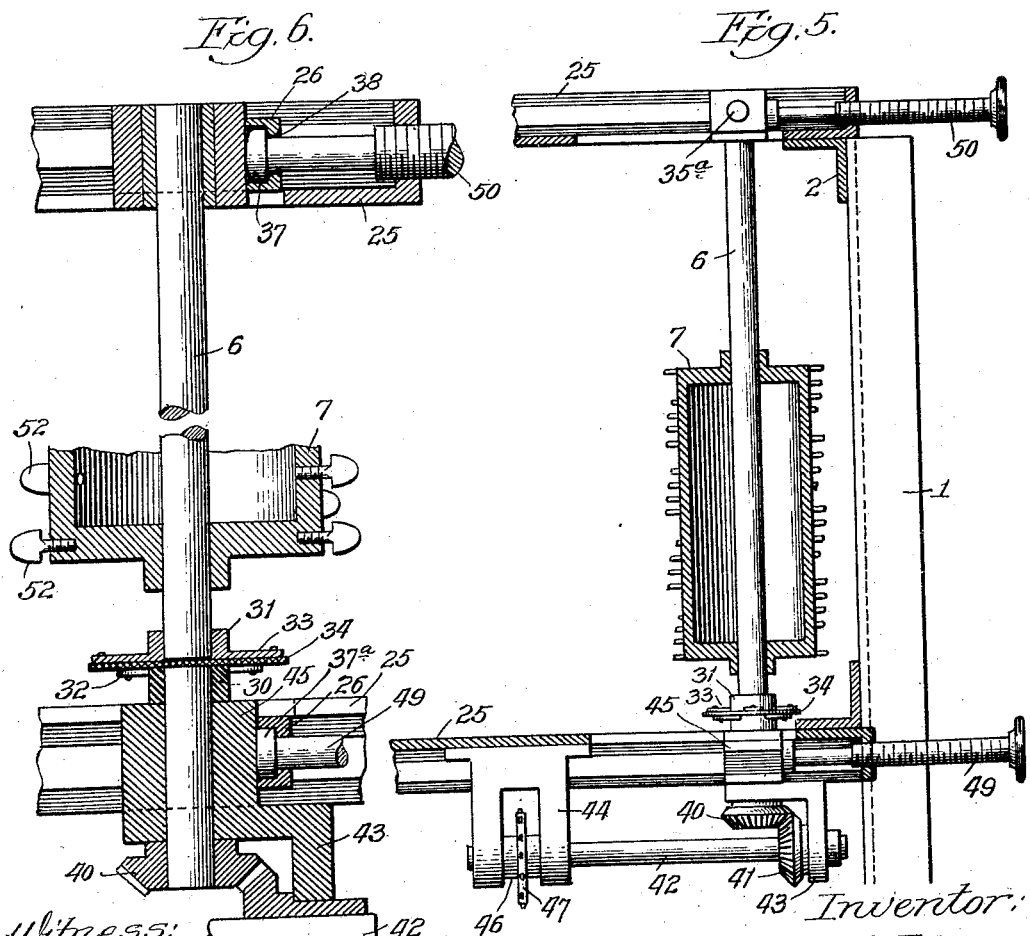

W. E. WILSON.
CLAY PRODUCT FACING MACHINE.
APPLICATION FILED MAY 1, 1920.

1,417,788.

Patented May 30, 1922.
5 SHEETS—SHEET 5.

Witness:
John Enders
Merrill M. Blackburn

Inventor:
William E. Wilson,
by Wallace R. Lane
Atty.

UNITED STATES PATENT OFFICE.

WILLIAM E. WILSON, OF MASON CITY, IOWA.

CLAY-PRODUCT-FACING MACHINE.

1,417,788.   Specification of Letters Patent.   Patented May 30, 1922.

Application filed May 1, 1920. Serial No. 378,059.

*To all whom it may concern:*

Be it known that I, WILLIAM E. WILSON, a citizen of the United States of America, and a resident of Mason City, Cerro Gordo County, Iowa, have invented new and useful Improvements in Clay-Product-Facing Machines, of which the following is a specification.

My invention relates to brick and tile making machines, and refers more particularly to machines for ornamenting the surface of the ribbon or tube coming from the forming machine. The particular use of the machine is to roughen the surface of the ceramic articles before they are baked.

Among the objects of my invention are to provide a machine capable of ornamenting one or more sides of a brick or tile at one time, according to the desire of the user; to provide a machine in which the rotary marking elements may be adjusted in position in the carrying frame, whereby to get them properly aligned with the opening from which the formed material issues; to provide a machine in which the rotary marking element may be adjusted as to angularity whereby it is possible to make the surface thereof assume a direction parallel to the face of the plastic ribbon or tube; to provide in a machine of the character described an efficient flexible joint for an interrupted shaft; to provide flexible driving connection between a pair of shafts, so that the shafts may be moved relatively towards or from each other without disturbing the driving connections; to provide improvements in the rotary marking element of a machine of the character described; to provide in such a machine a positively driven rotary marking element; to improve upon the method of ornamenting plastics; and such other objects, advantages and capabilities as will later more fully appear.

My invention further resides in the combination, construction, and arrangement of parts illustrated in the accompanying drawings, and while I have shown therein preferred embodiments, I desire the same to be understood as illustrative only and not as limiting my invention.

Figure 11:
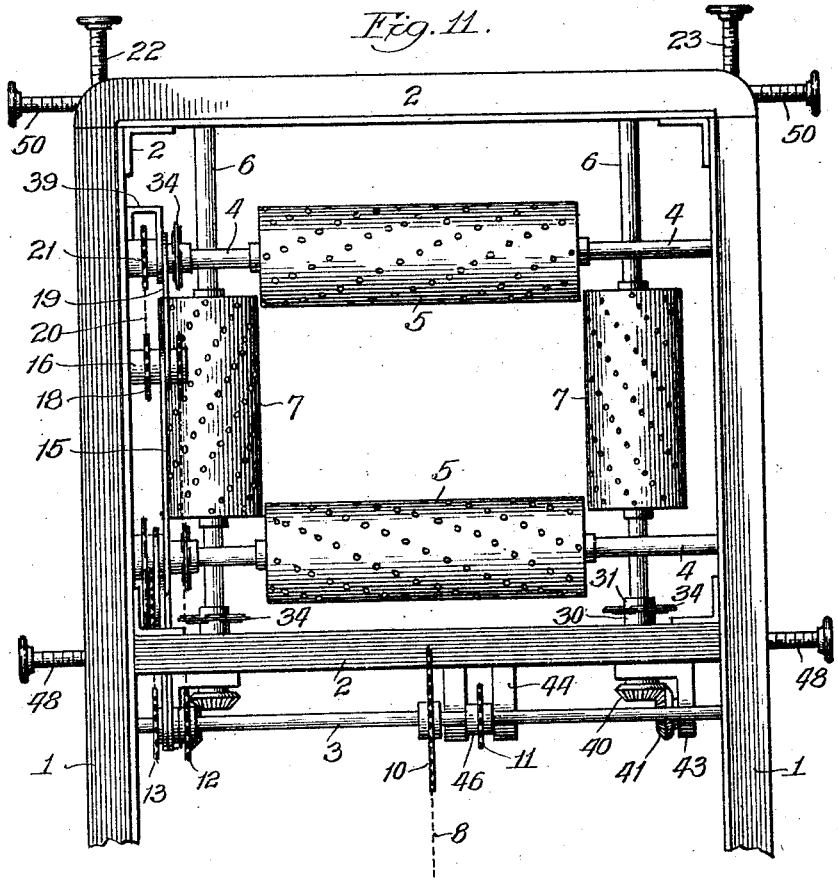
Figure 12:
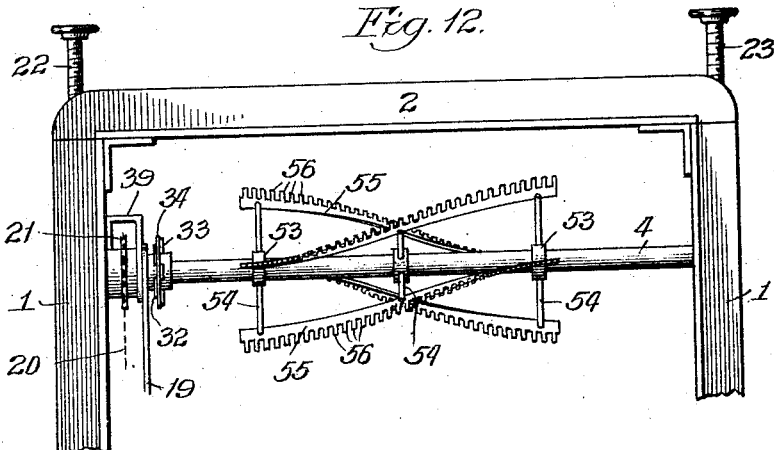

In the drawing attached hereto and forming a part hereof, Fig. 1 is a front elevation of one form of my invention; Fig. 2 is a right side elevation thereof; Fig. 3 is a vertical section along the plane indicated by the line 3—3, Fig. 1; Fig. 4 is a plan view of my device; Fig. 5 is a fragmentary vertical section substantially along the plane indicated by the line 5—5, Fig. 2; Fig. 6 is an enlarged similar section showing details of construction; Fig. 7 is a fragmentary section similar to Fig. 6 but taken at a right angle thereto; Fig. 8 is a transverse section through the shaft, to show the arrangement and construction of the flexible joint member; Fig. 9 is a perspective view of a tile illustrating coarse stippling effect, while Fig. 10 shows a grooving or scoring effect; Fig. 11 is a fragmentary elevation showing the use of four brushes instead of a lesser number; and Fig. 12 is a fragmentary elevation showing a modified structure of rotary marking element.

Various machines have been provided heretofore for marking upon the surfaces of ceramic articles while plastic, but these have failed to provide a positively driven rotary marking element, or else, if such marking elements were provided, they have been mounted in fixed position and incapable of being adjusted into parallelism with the surfaces of the emerging ribbon or tube, and further incapable of being adjusted to the position of such ribbon or tube. These and various other defects have been overcome in my present machine, which will now be described in detail in connection with the accompanying drawings, in which a plurality of posts 1, support various cross bars 2, an operating shaft 3, and interrupted shaft 4, adapted to support a rotary marking device 5. Supported by the cross bars 2 are vertical shafts 6 carrying rotary marking elements 7. It should be noted in this connection that one or more of these rotary elements may be used, and may be so arranged as to mark the top, the bottom or either of the sides of the plastic ribbon or tube as it comes from the forming machine. Fig. 1 shows the use of two such elements, one for the top and the other for one lateral edge of the ceramic material, while Fig. 11 shows the use of four such elements, so arranged as to mark both top and bottom and the two lateral sides of the ribbon or tube as it comes from the machine.

A motor M is mounted upon the frame composed of the posts 1 and cross bars 2 and is connected to shaft 3 by means of a chain 8 and sprocket wheels 9 and 10. Of course it is obvious that shaft 3 may be driven in any other desired manner, as for example, by being connected with the operating mechanism for the forming machine. Various other sprocket wheels 11, 12 and 13 may be mounted upon shaft 3 for the driving therefrom of the shafts carrying the rotary marking elements 5 and 7.

In order that horizontal shaft 4 may be adjusted in a vertical direction without affecting the tension of driving chain 14 an arm 15 is provided which carries at one end a shaft 16 upon which are mounted two sprocket wheels 17 and 18. Adjacent arm 15 and loosely mounted upon shaft 16 is an arm 19 through which passes one section of shaft 4. It will therefore be seen that as shaft 4 is caused to approach or recede from shaft 3 the elbow joint at 16 will bend permitting this approach or separation without affecting the tension of the chains 14 and 20, the latter passing over sprocket wheel 18 and a sprocket wheel 21 secured to shaft 4.

Vertical adjustment of the ends of upper shaft 4 is caused by means of a pair of screws 22 and 23 each threaded through an end 24 of channel members 25. These screws have enlarged ends enclosed within sockets 26 secured to one face of a bearing member 28 or 29, capable of reciprocating in the channel bars. It will be seen from the above that whenever screw 23 or 22 is advanced or retracted, block 28 or 29 corresponding thereto will be moved accordingly and will carry with it one end of shaft 4. In order to enable one end of the shaft to advance more rapidly than the other, when it is desired to adjust the surface of the rotary marking element into parallelism with the ribbon or tube of plastic ceramic material, the shaft 4 is interrupted or broken and has secured thereto a pair of collars 30 and 31 carrying arms 32 and 33, which are secured to opposite faces of a disc of leather or similar material 34, in alternating relation, as seen most clearly in Fig. 8. It will be seen from the above that however far the short end of shaft 4 may travel it always occupies a position parallel with its original one; also that means must be provided to accommodate the change in direction of the other end of the shaft. This may be done as shown in Fig. 7 with relation to shaft 6, in which the shaft is shown as surrounded by a bearing block provided upon its external surface with a pair of pintles 35ª, journalled in a pair of blocks 35 carried by and slidable in a channel iron 25. The block carrying the pintles is loosely enough mounted in block 35 to accommodate the turning motion due to the change in direction of the axis 6. Of course the same result might be accomplished in any other way desired. Provision for a certain amount of angular motion between the shaft 6 and the end of the adjusting screw is made by rounding the head 37 of the adjusting screw and making it fit loosely enough in a socket member 26 so that there will be no binding between the parts. It will also be observed that the flange of the socket member is rounded off as at 38 to enable freer motion at this point.

Since the construction of the parts connected with shafts 4 and 6 may be the same, similar numerals have been given to these parts in the various figures. In order to assist in holding the short section of shaft 4 in alignment, bracket 39 is provided, through which shaft 4 extends.

In order to operate vertical shaft 6, (Figs. 1 to 7) the same is provided with a bevel gear 40 which meshes with a bevel gear 41 carried by a shaft 42 supported in brackets 43 and 44, secured respectively to a block 45 and channel iron 25. Block 44 is slotted as shown at 46 in Fig. 5 for the reception of a sprocket wheel 47 in alignment with sprocket wheel 11, and over these sprocket wheels passes a chain 48 whereby shaft 42 may be driven from shaft 3. Since bevel gear 41 or sprocket wheel 47 is secured to shaft 42 and the other one is connected to said shaft by a spline or its equivalent it is obvious that bracket 43 may move relatively to block 44 and that as shaft 3 is driven, shaft 6 will also be driven.

In a construction such as that shown in the lower part of Fig. 6 where it is unnecessary to have angular motion between the adjusting screw 49 and the block 45, the head 37ª of the adjusting screw may be made cylindrical in form. The upper end of shaft 6 is adjusted laterally by means of a screw 50. Screws 22, 23, 50′ and 50 enable the operator to adjust either end of three of the four rotary marking elements shown in Fig. 11 in order to make it possible to cause this machine to register with the plastic forming machine. Assuming that the frame of my machine is secured to the frame of the plastic forming machine, it may be found that the opening between the rotary elements does not register exactly with the tube or ribbon of plastic material. If this be so, the appropriate screws are turned until the inner face of each of the rotary marking elements is parallel with the adjacent face of the ribbon or tube, and until the projections on these rotary elements cut into the plastic material the proper depth.

If the surface of the rotary element is caused to advance at the same rate as the surface of the plastic material, the impressions on the surface of said material will assume substantially the form of the projections on the surface of the rotary element. If, however, the rotary element is made to advance more rapidly than the surface of the plastic material, or if the surface of the rotary element moves in the opposite direction from that of the plastic material, the elongated scorings such as those shown in Fig. 10 will result. Fig. 9 illustrates the result obtained by operating the surface of the rotary element and the plastic material in the same direction, and at substantially the same rate.

Instead of using rotary elements with a continuous surface perforated for the reception of the scoring elements 51 or 52, collars 53 carrying arms 54 may be mounted upon the shafts and these arms may carry spirally arranged blades 55, upon the edges of which are projections 56, adapted to engage the plastic material. Inasmuch as any desired form of blade 55 may be used, the same results may be obtained with this form of construction as with the form shown in the other figures. Any desired form of scoring element may be used, two forms being shown at 51 and 52.

It is obvious that the cylindrical roller on which the scoring elements are mounted may be made of any desired material, such for example as wood or iron, and may be made either solid or hollow. It is also obvious that the pattern and character of the marking or scoring on the surface of the plastic material may be controlled by varying the number of rows of marking elements, the size and shape thereof, and the speed and direction of rotation of the elements. It will also be apparent that the machine may be adapted to any tile or brick machine on the market, and may be so adjusted as to give the desired marking or scoring on the surface of the plastic material.

It is also evident that some of the rollers may be caused to rotate in one direction and others in the opposite direction, to thereby vary the effect produced, and that the degree of roughness obtained may be varied by adjusting the depth to which the marking elements cut.

Though rollers to roll the scored surface are unnecessary they may nevertheless be used if desired, being either mounted upon the machine or built into it, or into a separate machine used adjacent to the present one.

It is of course understood that the specific description of structure and methods set forth above may be departed from without departing from the spirit of my invention as set forth in this specification and the appended claims.

Having now described my invention, I claim:

1. In a brick or tile making machine, the combination of a rotatable marking element having means thereon adapted to engage the surface of a moving ribbon or tube of ceramic material, means to cause rotation of said marking element, means for independently moving the ends of said marking element transversely to the direction of its axis and means to permit such movement without disturbing the driving means for the marking element.

2. In a surface marking machine, the combination of a rotatable marking element having means thereon adapted to engage the surface of a moving column of material, means for independently and positively moving the ends of the marking element toward or away from the material, and means connected with a moving part of the machine for rotating the marking element.

3. In a surface marking machine, the combination of a marking element positively rotated by the machine and having means thereon adapted to engage the surface of a moving column of material, means for independently and positively adjusting the ends of the marking element toward or away from the material.

4. In a brick or tile making machine, the combination of a marking element having thereon a plurality of members adapted to engage the surface of a moving ribbon or tube of ceramic material, and means for independently and positively moving the ends of said marking element toward or away from said ribbon or tube.

5. In a machine of the character described, a supporting frame, a plurality of rotatable marking elements thereon adapted to engage different faces of a ribbon or tube of ceramic material, means for positively rotating said marking elements, and means to adjust one or both ends of the axis of any marking element relatively to the frame and the said ribbon and transversely of the axis.

6. In a machine of the character described, a frame, driving means associated therewith, an interrupted shaft having one section thereof adjustably connected to the driving means and frame, and means for adjusting either or both ends of said shaft without interfering with the function of the driving connection.

7. In a machine of the character described, a frame, an interrupted shaft journaled therein, a marking element carried by said shaft, and means for adjusting either or each end of said shaft in a direction transverse to the length of the shaft.

8. In a machine of the character described, a frame, interrupted shafts journaled therein, a marking element carried by each shaft, and means for adjusting either or each end of any shaft in a direction transverse to the length of the shaft, said means comprising screws mounted in the frame and engaging movable members carrying the shafts.

9. A machine for ornamenting plastic ceramics, which comprises a rotary marking member, means for passing the ceramics through the machine, means for adjusting the marking member into parallelism with the surface of the ceramic, and means for positively rotating the marking member.

10. In a machine of the character described, a frame, an interrupted shaft journalled therein, flexible means connecting the adjacent ends of said shaft, a marking element carried by said shaft, and means for adjusting either or each end of said shaft in a direction transverse to the length of the shaft 11. A machine for ornamenting material, which comprises a rotary marking member, on a flexible shaft, means for passing material through the machine, means for adjusting the marking member into parallelism with the surface of the material, and means for positively rotating the marking member.

12. In a machine of the character described, a frame, a bracket movably mounted thereon, a shaft carried by the bracket, means for moving said bracket to adjust the shaft into parallelism with the surface of the material being operated on by the machine, and a marking element carried by the shaft.

13. The method of ornamenting plastic ceramics, which comprises passing the formed ceramics in plastic condition through a marking machine whose marking elements may be adjusted to parallelism with the surface of the ceramic, positively marking the material and adjusting the rate of marking until the desired effect is produced.

14. The method of ornamenting plastic ceramics which comprises passing the formed ceramics in plastic condition through a machine having a rotary marking member, adjusting the depth of cut into the surface of the material until it is uniform over the entire surface and of the depth desired, positively marking the material, and adjusting the rate of marking until the desired effect is produced.

In witness whereof, I hereunto subscribe my name to this specification in the presence of two witnesses.

WILLIAM E. WILSON.

Witnesses:
 FREDERICK F. MASON,
 MERRILL M. BLACKBURN.